Jan. 28, 1958     C. H. HAYNES     2,821,618
WELDING DEVICE
Filed April 19, 1955

INVENTOR.
Clyde H. Haynes

United States Patent Office 2,821,618
Patented Jan. 28, 1958

2,821,618

WELDING DEVICE

Clyde H. Haynes, Elyria, Ohio, assignor to Gregory Industries, Inc., Detroit, Mich., a corporation of Michigan Application April 19, 1955, Serial No. 502,405

3 Claims. (Cl. 219—98)

This invention relates generally to welding devices and more in particular to stud welding devices in which the entire device is expendable when the stud is welded to a work plate.

Present stud welding devices now on the market and the equipment used for welding the studs are not expendable with the stud being welded. Generally this equipment is a gun type holder for holding the stud to be welded and a control box for controlling the welding current. Obviously the gun and control box are not expendable and must be electrically connected to a suitable source of welding current. Usually the gun and control box for welding a stud have a combined weight of many pounds and take up a cubic foot or more of storage space. This equipment is also rather expensive if the person only wants to weld a relatively few studs since the selling price of the equipment is several hundred dollars.

The expendable welding device described, illustrated and claimed in this specification is primarily designed for use where relatively few studs are needed. Although the unit cost of a stud and its expendable welding device is considerably higher than the unit cost of a stud which would be welded with the equipment now on the market, the total cost of the expendable device and stud is much less than the cost of the present equipment and stud now on the market when only a few studs are to be used. The expendable welding device including the stud has a total volume only slightly greater than the stud itself.

The present device may be chucked into or onto a cable connection commonly used in splicing welding cable or it can be held by an ordinary welding rod holder which is in turn connected to the welding cable of the source of welding current. The present welding device provides a complete control and operating mechanism for welding the stud carried within the device to a work plate. After the stud has been welded to the work plate, the remaining part of the device may be discarded.

Therefore, one of the objects of the invention is to provide a stud welding device including a stud to be welded to a work plate which is discarded after the stud per se has been welded to the work plate.

Another object of the invention is to provide a complete stud welding device including the stud to be welded which is only slightly greater in size than the stud itself with the device capable of controlling the welding of the stud to a work plate.

A further object of the invention is to provide a stud welding device including a stud to be welded which may be used with any source of welding current without the need of any special equipment.

A still further object of the invention is to provide a welding device with two cup shaped metal caps mechanically and electrically joined by a fuse member and urged apart by resilient means including an electrical insulation wherein one of the caps is adapted to be connected to a source of welding current and the other of the caps is adapted to support a stud for welding.

And yet a further object of the invention is to provide a stud welding device constructed from a tubular housing having one end seatable against the work plate and adapted to enclose a stud to be welded to the work plate with the tubular housing provided with a cap attachable to a source of welding current and a fuse member attaching the cap to the stud in the housing and resilient means restrained by the fuse member and urging the stud out of the housing towards the work plate.

Other objects and a fuller understanding of the invention will become apparent from the following description and claims when taken in conjunction with the accompanying drawings in which:

Figure 1:
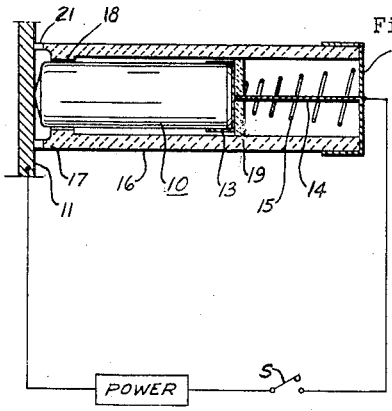
Figure 1 is a cross sectional view of a welding device.

The stud welding device illustrated in Figure 1 is designed to be electrically connected to a welding current power source "power" for welding a stud 10 to a work plate 11. The device includes two cup shaped metal caps 12 and 13 mechanically and electrically joined together by a fuse wire 14 and resiliently urged apart by a coil spring 15. The metal cap 12 is adapted to be connected to the welding current power source "power" through a switch S and the metal cap 13 is designed to support one end of the stud 10. The stud 10 is bearinged in an expendable ceramic tubular housing 16 which fits into the cap 12. The tubular housing 16 has a welding ferrule end 17 which seats against the work plate 11 and assists the welding of the stud 10 to the work plate 11. Also inserted between the spring 15 and the cap 13 is an insulator 19. The cap 12 has dimensions greater than the dimensions of cap 13.

The stud 10 may be of any suitable material which is weldable to the work plate and may have welding flux on the welding end thereof. Although the parts are illustrated for a cylindrical stud, it is understood that they may be modified for studs of other shapes, such as square, rectangular, hexagonal, etc.

The caps 12 and 13 are constructed of any suitable current conducting material and are connected by a fuse wire 14 which has physical properties whereby it burns through or fuses after a desired amount of current necessary to weld the stud to the plate has flowed therethrough. This fuse wire is preferably metal, and may take the form of a wire or ribbon.

The device operates as follows: When the switch S is closed, the current flows from "power" through cap 12, fuse 14, cap 13, stud 10 and plate 11 to "power" to create an arc between the stud 10 and plate 11 for melting the end of the stud 10 and the adjacent part of the plate 11. After a predetermined amount of current has been consumed, the fuse 14 fuses or burns through shutting off the flow of welding current and allowing the spring 15 to force the stud 10 towards the plate 11 to consummate the weld. The insulation member 19 between the spring 15 and the cap 13 prevents conduction of electricity or welding current from the cap 12 through the spring 15 through the cap 13 and thus to the stud 10 after the fuse 14 has burned through. After the welding of the stud 10 has been completed, the device is discarded and a complete new device used for welding another stud. Since the welding device was designed to be expendable, the outer cap 12 may be shaped to serve as a male connection of a welding cable connector or it may be designed to be held by an ordinary welding electrode clamp or any other suitable means.

It is generally desirable to make the housing 16 out of a ceramic or clay material such as is commonly used for stud welding ferrules. When this material is used, the end 17 which seats against the work plate 11 may be shaped to serve as the stud welding ferrule and provides the fillet cavity and welding chamber usually provided by a welding ferrule. To this end, gas vent recesses 21 are provided on the end 17 to allow for the escape flux gases and trapped air to thereby prevent improper flow of the weld metal. In the description the stud has been referred to as bearing in the housing 16. The term "bearing" is used in a broad sense to mean that the stud 10 is held in proper alignment by the housing 16 so that it will be welded perpendicular to the plate 10 or at such other angles as desired, and so that the stud 10 can be moved relative to the housing so that it can be plunged into the plate 11 for consummation of the weld. Near end 17, an annular shoulder 18 defines a guide surface opening to guide and provide bearing support for the stud 10. The insulator 19 carries the holding cap 13, and thereby serves as another guide surface.

In Figure 1 the cap 12 has a larger diameter than the cap 13 so that the housing 16 will slide into the cap 12 while the cap 13 is slidably positioned inside of the housing 16. Either the cap 13 or the insulator 19 should loosely bear in the housing 16 to support the free end of the stud 10 and hold it in alignment with the end 17 of the housing 16. As was previously mentioned, the larger cap 12 may be adapted to be chucked into a suitable welding cable connector and the small cap 13 constitutes a chuck for supporting the stud to be welded.

Figure 2:
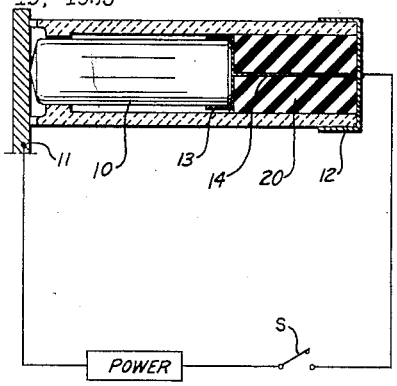
Figures 2, 3, 4 and 5 are cross sectional views of welding devices which operate similar to the device of Figure 1.

The device of Figure 2 is similar to that of Figure 1 and operates in the same manner. In this device a rubber block 20 or similar resilient means has been used in place of the spring and insulator of Figure 1. The rubber block 20 is positioned around the fuse member 14 and between the caps 12 and 13. The fuse member holds the rubber block in compression until the fuse member burns through at which time the block urges the stud 10 towards plate 11 to complete the weld. The rubber block is an electrical insulation material.

Figure 3:
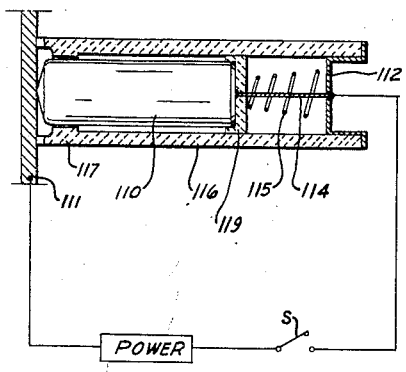

The stud welding device illustrated in Figure 3 is constructed of the same types of materials as the device of Figure 1. This device is designed to be electrically connected to a welding current power source "power" for welding a stud 110 to a work plate 111. The device includes cup shaped metal cap 112 mechanically and electrically joining stud 110 by a fuse wire 114 secured on one end to stud 110 and on the other end to cap 112 by any suitable means such as soldering. The stud 110 and cap 112 are resiliently urged apart by a coil spring 115. The metal cap 112 is adapted to be connected to the welding current power source "power" through a switch S. The stud 110 is bearinged in an expendable ceramic tubular housing 116 which fits onto the cap 112. The tubular housing 116 has a welding ferrule end 117 which seats against the work plate 111 and assists the welding of the stud 110 to the work plate 111. Also inserted between the spring 115 and the stud 110 is an insulator 119 which is cup shaped to receive the fuse end of sutd 110 and bearingly support it in the housing 116. The insulator 119 slides in the housing when the stud is moved towards the work plate.

Figure 4:
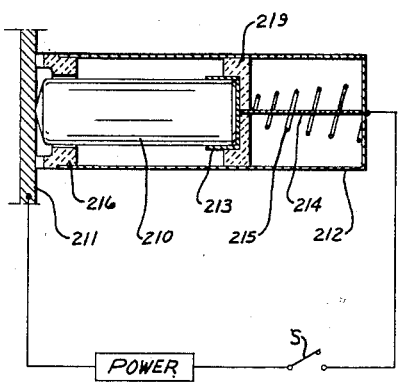

The stud welding device illustrated in Figure 4 is designed to be electrically connected to a welding current power source "power" for welding a stud 210 to a work plate 211. The device includes two cup shaped metal caps 212 and 213 mechanically and electrically joined together by a fuse wire 214 and resiliently urged apart by a coil spring 215. The metal cap 212 is adapted to be connected to the welding current power source "power" through a switch S and the metal cap 213 is designed to support one end of the stud 210. The stud 210 is bearinged at the welding end thereof in an expendable ceramic ferrule 216 which fits into the cap 212 and seats against the work plate 211 and assists the welding of the stud 210 to the work plate 211. Also inserted between the spring 215 and the cap 213 is an insulator 219 which is cup shaped to receive the fuse end of the stud 210 and bearingly support it in the cap 212. The insulator 219 slides in the cap 212 which has a length approximately equal to the combined length of the stud and fuse member. In this device the stud and control or fuse member and spring are practically all within the boundaries of the cap 212.

Figure 5:
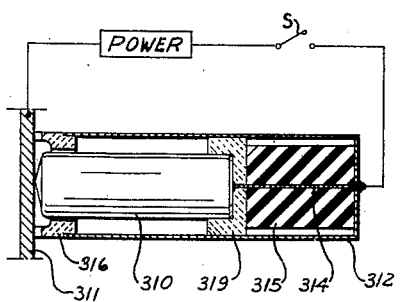

The stud welding device illustrated in Figure 5 is designed to be electrically connected to a welding current power source "power" for welding a stud 310 to a work plate 311. The device includes cup shaped metal cap 312 mechanically and electrically joined to stud 310 by a fuse wire 314. The stud and cap are resiliently urged apart by a rubber block 315. The metal cap 312 is adapted to be connected to the welding current power source "power" through a switch S. The stud 310 is bearinged at the welding end thereof in an expendable ceramic ferrule 316 which fits into the cap 312 and seats against the work plate 311 and assists the welding of the stud 310 to the work plate 311. Also inserted between the block 315 and the cap 313 is an insulator 319, which is cup shaped to receive the fuse end of the stud 310 and bearingly support it in the cap 312. The insulator 319 slides in the cap 312, which has a length approximately equal to the combined length of the stud and fuse member. In this device the stud and control or fuse member and spring are practically all within the boundaries of the cap 312.

Each of the various modifications illustrated operates in a similar manner to the other modifications illustrated. Similarly it is understood that the rubber block springs or any other material may be used which will generally urge the stud towards the work plate in place of the specific resilient means described in each of these modifications. The term resilient was used in the specification to mean that the spring or block would urge the stud away from the end of the housing which is connected to the power and towards the work plate to which the stud is to be welded.

Although this invention has been described in its preferred form with a certain degree of particularity enabling others to reproduce the invention, it is understood that the present disclosure has been made by way of example and that numerous modifications and changes in the details may be resorted to without departing from the spirit and scope of the invention as defined in the claims which are made a part hereof.

The embodiments of the invention in which an exclusive property or privilege is claimed are defined as follows:

1. A stud welding device comprising, a guide housing having a ferrule end, said ferrule end having gas vent recesses, the housing having guide surfaces defining a stud slide path extending through said ferrule end, a weld stud mounted in said slide path, resilient means positioned to urge the stud to move along said path toward said ferrule, a fuse link member holding said resilient means ineffective to so urge the stud, and electrical circuit means including said link and stud for applying an electrical welding potential between said stud and any conducting workpiece positioned across the said ferrule end, whereby said fuse may be selected to release said resilient means upon passage of a predetermined amount of welding power through the stud.

2. A stud welding structure according to claim 1 wherein the resilient means is a spring.

3. A stud welding structure according to claim 1, wherein the resilient means is a resilient block.

References Cited in the file of this patent

UNITED STATES PATENTS

| | | |
|---|---|---|
| 1,655,842 | Pelletier et al. | Jan. 10, 1928 |
| 1,977,191 | Levenstein | Oct. 16, 1934 |
| 2,174,477 | Pittman et al. | Sept. 26, 1939 |